Sept. 29, 1959    J. C. DONOHUE ET AL    2,906,975
ELECTRICALLY NON-CONDUCTIVE FLANGE CONNECTOR
DEVICE FOR WAVEGUIDES
Filed Feb. 12, 1957
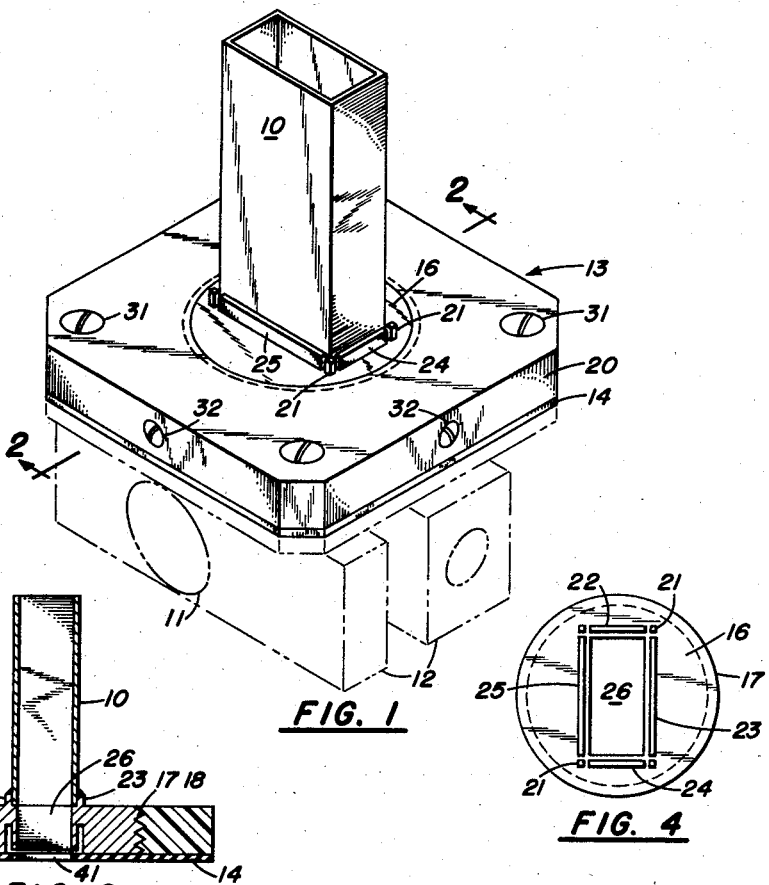
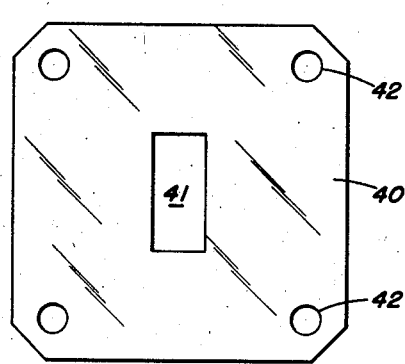
INVENTORS
JOHN C. DONOHUE
JOSEPH DE FIORE
BY
ATTORNEYS

United States Patent Office 2,906,975
Patented Sept. 29, 1959

2,906,975
ELECTRICALLY NON-CONDUCTIVE FLANGE CONNECTOR DEVICE FOR WAVEGUIDES

John C. Donohue, Hanover, Md., and Joseph De Fiore, Wilmington, Del., assignors, by mesne assignments, to the United States of America as represented by the Secretary of the Navy Application February 12, 1957, Serial No. 639,840

2 Claims. (Cl. 333—98)

This invention relates to connector devices for connecting electronic units, such as klystrons, to grounded waveguides, the electronic unit operating above ground potential.

Connector devices of the type referred to are in use, as applied to klystrons and waveguides, wherein the metallic mounting face of the klystron and the grounded waveguide are insulated from each other by a sheet of insulating material, the units being held together by bolts passing through adjoining metal flanges of the units and the insulation sheet, with the bolt holes in one of the devices being oversized to receive insulation sleeves. A disadvantage of this construction lies in the formation of electrical leakage paths between the bolts and flange over the insulation sleeve and sheet bolt clearance area due to moisture and dirt; also, the adjustment of the insulation sheet cutout for alignment with the klystron window and waveguide tubing is restricted by the necessary reduction of clearance area in the insulation for preventing voltage breakdown.

Accordingly, it is the object of the present invention to provide a connector in which danger of electrical leakage between the connected parts is practically eliminated. An object, also, is to provide connector insulation which is readily susceptible to adjustment for electrical alignment of the coacting units.

Other objects and many of the attendant advantages of this invention will be readily appreciated as the same becomes better understood by reference to the following detailed description when considered in connection with the accompanying drawings wherein:

Fig. 1 is a view in perspective of the connector joining a waveguide to a klystron tube;

Fig. 2 is a view in vertical section taken along lines 2–2 of Fig. 1;

Fig. 3 is a plan view of the external flange section;

Fig. 4 is a plan view of the inner flange section prior to connection with the waveguide; and Fig. 5 is a plan view of the mica insulation sheet.

Referring to Fig. 1, the combined device is shown including the waveguide 10, the klystron 11 mounted on insulation flanges 12, and the flange connector 13. Both the waveguide and klystron are of conventional design, the klystron having, however, a plate section 14 for attachment to connector 13. Connector 13 includes a central circular, metal flange section 16 having peripheral threads 17 adapted to have screw-threaded engagement with an internal thread 18 formed on the edge of an opening 19 in the outer flange section 20.

The waveguide 10 is shown as a rectangular tube, the edge of the lower end of which is adapted to abut corner-pins 21 and elevated ridges 22, 23, 24 and 25 adjacent the edge of an opening 26 formed in the flange section 16, the waveguide 10 being brazed or otherwise attached to the flange surface, ridges and pins. The size of the flange opening 26 corresponds to the inner dimensions of the connecting end of waveguide 10.

The outer flange section 20 is of any suitable insulating material and is provided with corner holes 30 in which bolts 31 or other fasteners may be inserted for extension into and attachment to the klystron support plate 14. Set screws 32 are inserted in edge screw openings in flange section 20 to secure a maintained klystron adjustment for optimum performance, the screw-thread attachment permitting both angular and transverse adjustment of the flange sections relative to each other.

Interposed between the klystron support flange 14 and the combined flange sections 16 and 20 is a mica insulation sheet 40, the function of which is to insulate effectively the inner metal flange from the klystron support plate 14 at points external to the edges of the cut-out aperture or opening 41, which has the same approximate dimensions as the interior dimensions of the wageguide end and the opening 26 in the inner flange section. The clearance holes 42 of the mica sheet are made oversized relative to the attachment bolts 31 so that the opening 41 may be adjusted relative to the opening 26 in the inner flange section 16 and the tubular interior of the waveguide. Since the clearance holes 42 in the sheet are contiguous to the insulating outer flange section 20, there is no special limitation on the degree of oversize other than avoidance of extension to the opening 19, and, consequently, the sheet may be freely moved to secure accurate alignment of the sheet opening 41 with the inner flange section opening.

In the assembly of the device, the outer flange section of connector 13 is screw-threaded to the inner flange 16 which has previously been brazed to the waveguide end. The klystron plate 14 with the attached klystron 11 is then placed in bolting position, with the mica plate 40 placed between the connector 13 and plate 14 and adjusted for alignment of opening 41 with the waveguide interior, the flange opening 26 and the klystron window. The connector flange sections are then adjusted relative to each other for optimum performance, the klystron preferably being in operation for this adjustment, and set screws 32 secured to prevent maladjustment in service.

While the connector has special utility as applied to klystrons, it may be applied with equal facility to electical units, wherein similar requirements of waveguide coaction exist.

Obviously many modifications and variations of the present invention are possible in the light of the above teachings. It is therefore to be understood that within the scope of the appended claims the invention may be practiced otherwise than as specifically described.

What is claimed is:

1. An insulating connector device for joining waveguides at ground potential with electric units normally operated at above ground potential, which comprises a waveguide having an open end, an inner metallic flange section having an opening therein attached to said waveguide open end, an outer electrically insulating flange section, means for adjustably attaching said outer flange section in continuous, coplanar and concentric relationship to said inner flange section to form a single rigid flange unit, an electric unit having a support plate, means for fastening together said plate and outer flange section, means mounted within said outer flange section for holding said outer flange section fixed with respect to said inner flange section at adjusted points of optimum electrical performance, and an apertured insulation sheet interposed between said plate and flange sections, the opening in said inner flange section coinciding approximately with the interior opening of said waveguide.

2. The connector device for joining waveguides and electric units as defined in claim 1, with said fastening means consisting of bolts passing through aligned openings in said outer insulating flange section, electric unit support plate and insulation sheet, the bolt openings in said insulation sheet being oversized to permit lateral adjustment of the sheet for alignment of the aperture in said sheet with said inner plate and waveguide openings, said sheet bolt opening being juxtaposed to said outer insulation flange section.

References Cited in the file of this patent

UNITED STATES PATENTS

| | | |
|---|---|---|
| 2,473,834 | Tuller | June 21, 1949 |
| 2,476,621 | Okress | July 19, 1949 |
| 2,726,101 | Peterson | Dec. 6, 1955 |